United States Patent

[11] 3,609,280

[72] Inventor Evgeny Vasilievich Kholodnov
 ulitsa Vokzalnaya, 21, kv. 30, Fryazino
 Moskovskoi oblasti, U.S.S.R.
[21] Appl. No. 873,856
[22] Filed Nov. 4, 1969
[45] Patented Sept. 28, 1971

[54] METHOD OF MAKING APERTURES AND SLOTS IN ELECTRICALLY CONDUCTIVE WORKPIECES BY EDM
 3 Claims, 3 Drawing Figs.
[52] U.S. Cl. .................................................. 219/69 M, 219/69 V
[51] Int. Cl. .................................................. B23p 1/08
[50] Field of Search .......................................... 219/69 E, 69 F, 69 M, 69 V

[56] References Cited
UNITED STATES PATENTS
2,730,602  1/1956  Porterfield .................. 219/69 V
3,240,914  3/1966  Hill et al. ..................... 219/69 M
3,333,080  7/1967  DeVries ....................... 219/69 M Primary Examiner—R. F. Staubly
Attorney—Waters, Roditi, Schwartz & Nissen ABSTRACT: A method of forming an aperture in an electrically conductive workpiece by a spark-eroding technique, comprises rotating an electrode tool while simultaneously the work displacing the same axially along its axis of rotation towards the workpiece to bring a working portion of the tool into proximity with the workpiece to form an aperture in the workpiece while concurrently introducing an additional electrode tool between the workpiece and the first electrode tool at an end face thereof, to produce a desired shape for the working portion of the first electrode tool. The additional electrode tool can be displaced longitudinally thereof, to compensate for wear of the additional electrode in the course of formation of the working portion of the first tool. Also the additional electrode can be displaced transversely to vary the diameter of the working portion of the first tool and thereby vary the diameter of the aperture which is formed in the workpiece.

METHOD OF MAKING APERTURES AND SLOTS IN ELECTRICALLY CONDUCTIVE WORKPIECES BY EDM

The present invention relates to methods of making apertures and slots in electrically conductive workpieces by a spark-eroding technique, with the use of a rotary electrode tool, and can be practically employed for making such apertures and slots with a high accuracy. The present invention can be used most effectively in cases in which highly accurate apertures and slots are to be made in electrically conductive workpieces, the thickness of such workpieces being many times, e.g. 15 or 20 times, greater than the diameter of an aperture to be made or than the width of a slot to be cut therein.

Known in the art is a method for making apertures and slots in electrically conductive workpieces by the spark-eroding technique, with the electrode tool being displaced along the axis of its rotation during operation.

According to the known method, apertures and slots are made with an electrode tool which should be produced beforehand, prior to the commencement of the operation.

With this known method, the wearing away of the electrode tool in the course of operation is responsible for comparatively poor accuracy in making apertures and slots, since a worn electrode tool leads to variations in the size of such apertures and slots. Besides, the wearing away of the electrode tool makes it necessary to replace the tools quite frequently, with the resultant loss of processing time.

It is, therefore, an object of the present invention to eliminate the above-mentioned disadvantages of the known method.

The present invention contemplates a method of making apertures and slots in electrically conductive workpieces by a spark-eroding technique, which will provide for increased accuracy in making such apertures and slots, as well as for greater efficiency of such operation.

This is accomplished by a method of making apertures and slots in electrically conductive workpieces by spark-eroding technique, with the use of a rotary electrode tool displaced axially in the course of operation, which method, according to the present invention, comprises the step of introducing a second electrode tool between the workpiece being processed and a nonprofiled portion of the rotary electrode tool, this second electrode tool being adapted to maintain a desired shape of the working portion of the rotary electrode tool directly in the course of forming the apertures and slots.

The second electrode tool is preferably of wire form or the like and it is expedient to displace the second electrode tool in relation to the rotary electrode tool in the course of operation, whereby the wearing away of the second electrode tool is compensated.

The employment of the method embodying the present invention for making apertures and slots in electrically conductive workpieces ensures a high degree of accuracy of such apertures and greater efficiency of the processing operation.

The present invention will be better understood from the following detailed description of a method embodying the invention and of certain features of an apparatus based on this method, due reference being made to the accompanying drawings, in which.

The method of making apertures and slots in electrically conductive workpieces by a spark-eroding technique, according to the present invention is, as follows.

Figure 2:
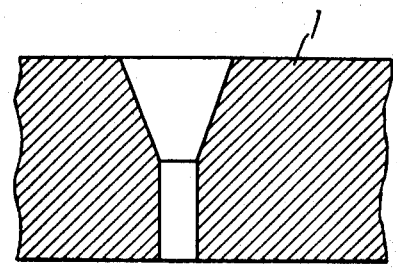
FIG. 2 is a cross-sectional view of a workpiece in which the illustrated aperture has been made by a spark-eroding technique, according to a method embodying the present invention.
Figure 1:
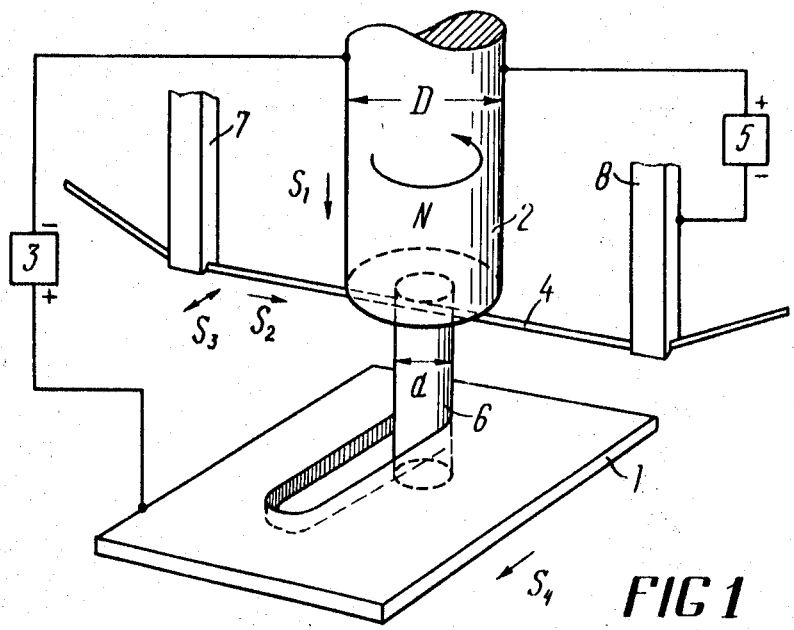
FIG. 1 shows schematically the relative displacements of the electrode tools and of the electrically conductive workpiece in which an aperture or a slot is made by a method embodying the invention.
Figure 3:
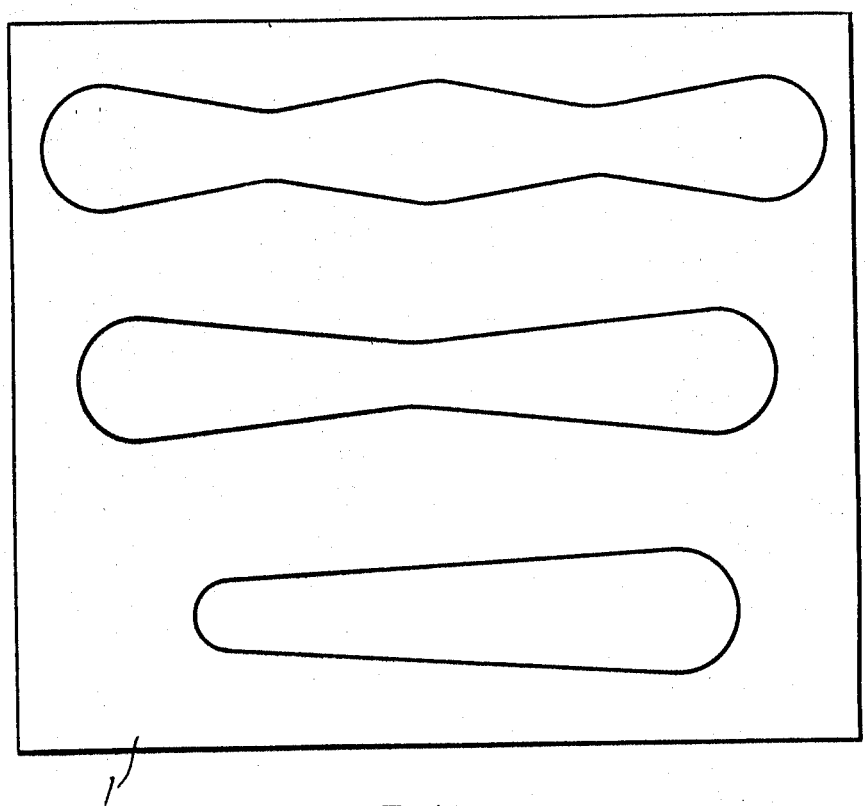
FIG. 3 shows a workpiece in which the slots have been made by a method embodying the invention.

A workpiece 1 to be processed (FIG. 1) and an electrode tool 2, for example, a wire of a diameter designated by D are connected electrically to a power source 3. Then a second electrode tool 4 in the form of a wire or tape is introduced between the workpiece 1 and the face end of the first electrode tool 2, whereafter both electrode tools 2 and 4 are connected to another power source 5. After this has been done, the first electrode tool 2 is rotated at an angular speed N and simultaneously fed axially in a direction $S_1$ toward the workpiece 1 being processed. At the same time, the second electrode tool 4 is moved in relation to the electrode tool 2 in a direction $S_2$. A spark eroding process which takes place between the second electrode tool 4 and the rotating and axially moving first electrode tool 2 maintains the desired circular shape of the working portion 6 of the electrode tool 2 and ensures the dimensional stability of this working portion 6. The second electrode tool 4 is continuously moved lengthwise in a lateral direction in relation to the rotating electrode tool 2, i.e. in direction designated by the arrow $S_2$ in FIG. 1, so as to compensate for wearing away of this electrode tool 4 on account of the spark eroding process between the latter and the rotating electrode tool 2 of which the working portion 6 is shaped by this process. Motion of the second electrode tool 4 in the direction $S_2$ is guided by guiding members 7 and 8. If the second electrode tool 4 is additionally displaced in a direction $S_3$, the diameter d of the working portion 6 of the rotating electrode tool 2 can be varied, whereby a method embodying the present invention can be used for making apertures of a varying diameter (FIG. 2).

In case an aperture is to be made in the workpiece 1, the latter is held stationary during the operation. If a slot is to be made in the workpiece 1 (FIG. 1), the latter can be displaced in relation to the axis of rotation of the first electrode tool 2, e.g. in a direction $S_4$. Thus, a method embodying the present invention may be used for making slots of a constant or varying width.

In the cases where apertures of a very small diameter or slots of a very small width are to be made, and the thickness of a workpiece is many times, e.g. 15 or 20 times, greater than the diameter of the apertures or the width of the slots, the rigidity of the portion 6 (FIG. 1) of the rotating electrode tool 2 can be increased by using a very thin wire, such as one having the diameter of about 20 to 30 microns, as the second electrode tool 4, and by placing the second electrode tool 4 in close proximity to the workpiece 1, the spacing between the two being about 50 to 100 microns.

It should be understood that the embodiment described hereinbefore is but one of many possible ways of using the method according to the present invention, and that various modifications and changes may take place without departing from the true spirit and scope of the invention, as set forth in the appended claims.

What is claimed is:

1. A method of forming an aperture in an electrically conductive workpiece by a spark-eroding technique with the use of an electrode tool, said method comprising the steps of rotating the electrode tool while simultaneously displacing the same axially along its axis of rotation towards the workpiece to bring a working portion of the tool into proximity with the workpiece to form an aperture in the workpiece, and concurrently introducing an additional electrode tool between said workpiece and the first-mentioned electrode tool at an end face thereof to produce a desired shape for the working portion of said first-mentioned electrode tool concurrently with the formation of said aperture.

2. A method as claimed in claim 1, comprising displacing said additional electrode tool longitudinally thereof in relation to said first-mentioned electrode tool and simultaneously with the movement of the first-mentioned tool to compensate for wearing away of said additional electrode tool in the course of operation.

3. A method as claimed in claim 1 comprising displacing said additional electrode tool transversely thereof in relation to said first-mentioned electrode tool to vary the diameter of the working portion which is produced and thereby the diameter of the aperture formed in the workpiece.